(12) United States Patent
Demchenko et al.

(10) Patent No.: US 11,360,054 B2
(45) Date of Patent: Jun. 14, 2022

(54) ACOUSTIC WAVEGUIDE

(71) Applicants: Aleksandr P. Demchenko, St. Petersburg (RU); Nikolai I. Balin, St. Petersburg (RU)

(72) Inventors: Aleksandr P. Demchenko, St. Petersburg (RU); Nikolai I. Balin, St. Petersburg (RU)

( * ) Notice: Subject to any disclaimer, the term of this patent is extended or adjusted under 35 U.S.C. 154(b) by 0 days.

(21) Appl. No.: 16/993,755

(22) Filed: Aug. 14, 2020

(65) Prior Publication Data

US 2020/0371067 A1    Nov. 26, 2020

Related U.S. Application Data

(63) Continuation of application No. PCT/RU2019/000052, filed on Jan. 29, 2019.

(30) Foreign Application Priority Data

Feb. 14, 2018  (RU) ................................ 2018105641

(51) Int. Cl.
*G01N 29/24* (2006.01)
*G10K 11/22* (2006.01)

(52) U.S. Cl.
CPC ......... *G01N 29/2462* (2013.01); *G10K 11/22* (2013.01)

(58) Field of Classification Search
CPC ..... G01N 29/2426; G10K 11/22; G10K 11/24
USPC .......................................................... 73/644
See application file for complete search history.

(56) References Cited

U.S. PATENT DOCUMENTS

| | | | |
|---|---|---|---|
| 2,503,831 A | 4/1950 | Mason | |
| 2,684,725 A | 7/1954 | Kock | |
| 3,229,523 A | 1/1966 | Boyd et al. | |
| 3,546,498 A | 12/1970 | McMaster et al. | |
| 3,708,745 A | 1/1973 | McMaster et al. | |
| 3,757,257 A | 9/1973 | Knitter | |
| 4,217,786 A | 8/1980 | Okude et al. | |
| 4,564,881 A * | 1/1986 | Kant | G01F 23/263 361/284 |
| 4,945,276 A * | 7/1990 | Mylvaganam | G01F 1/662 310/326 |

(Continued)

FOREIGN PATENT DOCUMENTS

WO    2017/062006 A1    4/2017

OTHER PUBLICATIONS

International Search Report from PCT/RU2019/000052, filed Jan. 29, 2019, dated May 16, 2019.

(Continued)

*Primary Examiner* — Nimeshkumar D Patel
*Assistant Examiner* — Jean F Morello
(74) *Attorney, Agent, or Firm* — Patentbar International P.C.

(57) ABSTRACT

The acoustic waveguide has a flexible metal rod with a cylindrical waveguide rigidly attached to each end of the same through a conical acoustic concentrator. One cylindrical waveguide is capable of being attached to an electroacoustic transducer and the other cylindrical waveguide is capable of being attached to an acoustic oscillation receiver. The structure provides for the enhanced functional capabilities of the acoustic waveguide by utilizing it in devices operating under conditions of high temperature, radiation, strong electromagnetic interferences and other negative factors.

7 Claims, 3 Drawing Sheets

(56) References Cited

U.S. PATENT DOCUMENTS

| | | | |
|---|---|---|---|
| 5,022,014 A | 6/1991 | Kulczyk et al. | |
| 5,103,672 A * | 4/1992 | Terry, Jr. | G01F 23/268 |
| | | | 361/284 |
| 5,966,983 A | 10/1999 | Pfeiffer et al. | |
| 6,246,821 B1 * | 6/2001 | Hemken | G02B 6/4415 |
| | | | 385/100 |
| 8,746,399 B2 | 6/2014 | Ao et al. | |
| 2009/0192388 A1 | 7/2009 | Yamada et al. | |
| 2010/0052479 A1 * | 3/2010 | Breeuwer | B06B 3/00 |
| | | | 310/335 |

OTHER PUBLICATIONS

Sensors and systems of ship automation, Valkom, Booklet, p. 7, 2017, https://docplayer.ru/31881415-Datchiki-i-sistemy-cudovoy-avtomatiki.html.

* cited by examiner

ACOUSTIC WAVEGUIDE

RELATED APPLICATIONS

This application is a Continuation application of International Application PCT/RU2019/000052, filed on Jan. 29, 2019, which in turn claims priority to Russian Patent Application RU 2018105641, filed Feb. 14, 2018, both of which are incorporated herein by reference in their entirety.

FIELD OF THE INVENTION

The invention relates to devices for the transmission of ultrasonic oscillatory energy from a source to a receiver and/or in the reverse direction.

Most often, ultrasonic acoustic waveguides structurally are tubes, rods, plates or their combinations, whose shape, structure and dimensions are defined by the task to be solved as well as the operating conditions.

Acoustic waveguides may be used for measuring the characteristics of materials, medium parameters, in indicating devices.

The examples of waveguide structures are reflected in patent documents.

U.S. Pat. No. 8,746,399, publication dated 6 Oct. 2014, MPK G10K11/00 describes the structure of a rod waveguide with a device for attaching it while passing through the tube with ensuring efficient hermetic sealing even under high-pressure conditions.

The application WO2017062006, publication dated Apr. 13, 2017, MPK E21B47/12 discloses an acoustic waveguide device for communication between a transmitter in a well and a receiver on the surface. A waveguide in a wellbore is a static waveguide comprising a casing string or a production tube, and where a tubular well tube is an impact tube containing a flexible tube or a connected tube.

Ultrasonic waveguides are used in the generation, transmission, and/or receipt of signals in the form of sonic or ultrasonic oscillations in operations under extreme conditions. For example, under extreme low or high temperatures, at a significant density of the surrounding medium, a high activity of penetrating radiation, extreme electromagnetic interferences, strong vibrations, the presence of aggressive substances hazardous to device components.

SUMMARY OF THE INVENTION

The technical result achieved by this invention is the enhanced functional capabilities of the acoustic waveguide as utilized in devices operating under the conditions of high temperature, radiation, strong electromagnetic interferences and other negative factors.

An acoustic waveguide comprising a flexible metal rod, each end of the flexible metal rod being rigidly coupled via a conical acoustic concentrator to a cylindrical waveguide, wherein one cylindrical waveguide is configured for connecting to an electroacoustic transducer and the other cylindrical waveguide is configured for connecting to an acoustic oscillation receiver.

The term "receiver" in this case means a device capable of receiving or inducing acoustic signals in antennas of various devices; transforming the energy of mechanical oscillations into acoustic oscillations; receiving or transmitting the information as a sequence of pulses, or the information encoded in the frequency or amplitude of acoustic oscillations.

The key and non-obvious features of this acoustic waveguide structure are the ability to arrange the electroacoustic transducer and receiver in any place, while placing them at a considerable distance from each other. This is achieved by the flexible metal rod of the waveguide which may be bent over a wide range, take different forms, and be placed in aggressive media. Moreover, the cylindrical waveguides of the acoustic waveguide may be rigidly and hermetically attached in any barriers: walls, partitions, divisions, and etc. For example, a cylindrical waveguide may simply be welded into a metal wall along the external surface.

All this allows to isolate the electroacoustic transducer structure, and, if necessary, the receiver from any negative factors. The role of the third component of the structure, conical acoustic concentrators, is extremely important. They allow for acoustically matching the acoustic properties of the flexible metal rod and cylindrical waveguide with each other.

In one specific embodiment, the flexible metal rod can be shaped as necessary to be placed in the allocated space.

The flexible metal rod can be made as a wire with a diameter not exceeding 6 mm. In this case, the metal waveguide can be disposed in the space in the simplest way.

In particular, the conical acoustic concentrator is rigidly attached to the flexible metal rod by its top and it is rigidly coupled by its wide part to the cylindrical waveguide.

In addition, a diameter of the top of each conical acoustic concentrator is equal to a diameter of the flexible metal rod, and wherein a diameter of the wide part of each conical acoustic concentrator is equal to a diameter of its cylindrical waveguide.

The cylindrical waveguide can configured for being rigidly coupled to the receiver.

The external surface of at least one cylindrical waveguide, if necessary, can be configured for being rigidly and hermetically coupled in the partition intersected by the waveguide.

To extend the service life, to stabilize the waveguide characteristics over time, for protection against possible corrosion and for hermetic sealing of this part of the waveguide placed in fluid viscous media, a section of the waveguide comprising a flexible metal rod and conical acoustic concentrators can be placed in a protective flexible tube.

In this case, the protective flexible tube can be made hermetical, wherein adaptors for attaching the flexible waveguide inside the protective flexible tube, and wherein ends of the protective flexible tube comprise attachment nodes for attaching the protective flexible tube to external surfaces of the cylindrical waveguides.

DETAILED DESCRIPTION OF THE PREFERRED EMBODIMENTS

An acoustic waveguide (FIG. 1) comprises a flexible metal rod 1 with conical acoustic concentrators 2 being rigidly attached by their tops 15 (FIG. 2) to a corresponding end of flexible metal rod 1.

Cylindrical parts of the acoustic waveguide, differing in their diameters, have different acoustic impedances: the smaller the diameter, the lower the acoustic impedance, and vice versa.

Figure 3:
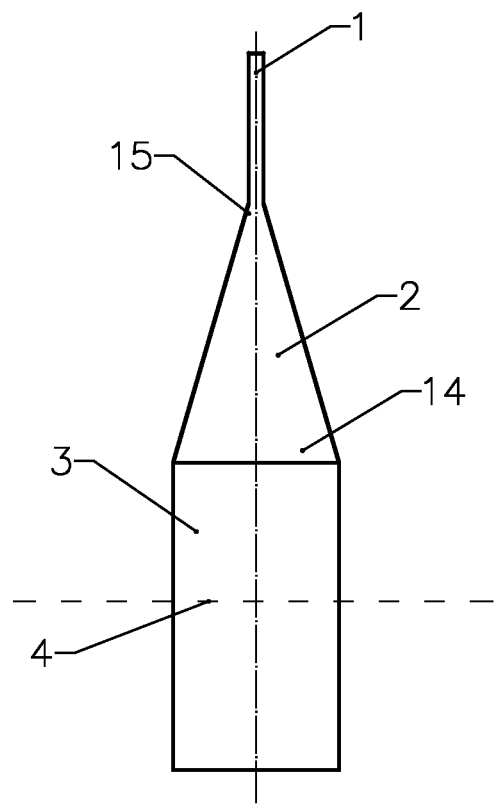
FIG. 3 shows a structure of a cylindrical waveguide with a conical acoustic concentrator.

A cylindrical waveguide 3 is rigidly attached to a wide part 14 of each conical acoustic concentrator 2. Flexible metal rod 1 can be made as a flexible bar or wire with a diameter not exceeding 6 mm. An external surface of cylindrical waveguide 3 has an area 4 (FIG. 1, FIG. 3), along which cylindrical waveguide 3 may be rigidly and hermetically attached in a partition 10 (FIG. 5) intersected by cylindrical waveguide 3.

With a cylindrical waveguide being welded to a partition, the thickness of a weld seam was considerably smaller than the wavelength of the oscillations in the waveguide material and smaller than the waveguide diameter. At frequencies in the range of, for example, 100 kHz and a waveguide diameter of 16 mm, the seam can be about several millimeters. The thicker the seam, the higher the losses of acoustic energy.

Figure 2:
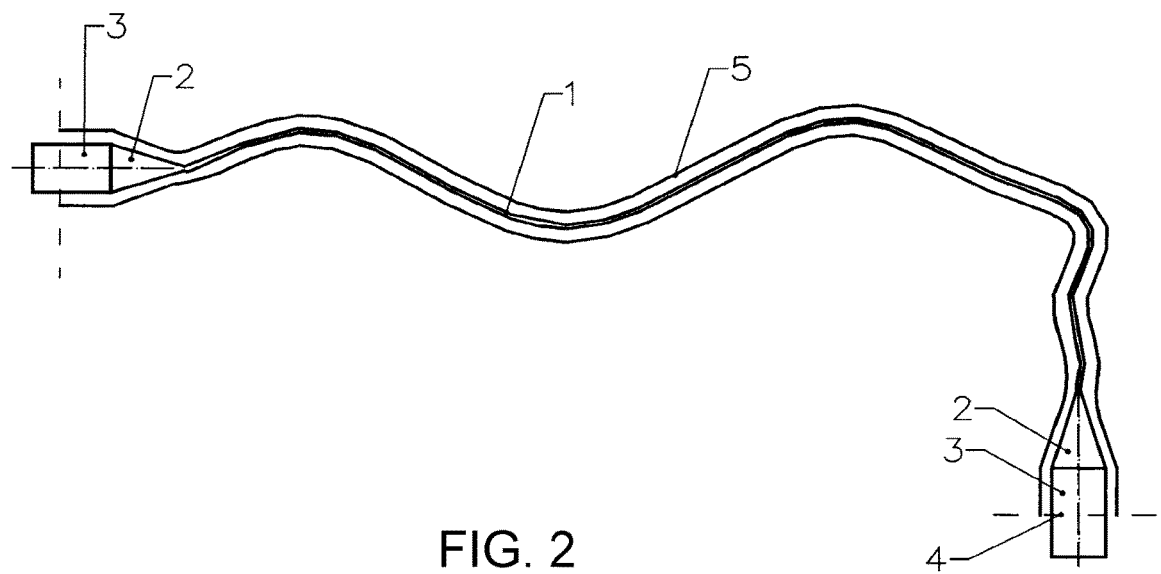
FIG. 2 shows a structure of an acoustic waveguide with a protective flexible tube.

A section of the acoustic waveguide comprising flexible metal rod 1 and conical acoustic concentrators 2 can be placed in a protective flexible tube 5, for example, a hermetic corrugated metal tube to protect them from contaminations, fluids, and damage (FIG. 2).

Figure 4:
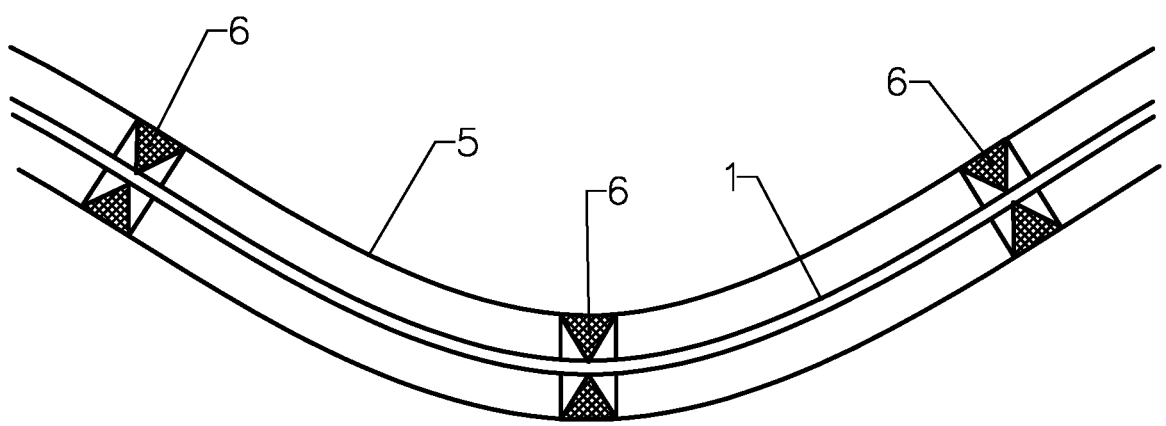
FIG. 4 shows a part of an acoustic waveguide shell with adaptors.

Protective flexible tube 5 can be fitted with adapters 6 (FIG. 4) for attaching the protective flexible tube 5 to the external surface of flexible metal rod 1. Adapters 6 can be conical sleeves with an internal aperture for a wire, the aperture approximately slightly exceeding the diameter of flexible rod (wire) 1. The ends of protective flexible tube 5 can comprise adapters (not shown) for attaching protective flexible tube 5 to the external surface of cylindrical waveguide 3.

The present structure utilizes conical concentrators to match the sections with different acoustic impedances. Conical concentrators function as transducers—transformers of acoustic energy. In a transition from large to small diameter in the concentrator, the acoustic energy is transformed—the oscillatory speed increases and simultaneously the sound pressure and acoustic impedance decrease. And vice versa, in a transition from a small to a large diameter, the oscillatory speed decreases and the acoustic pressure and acoustic impedance increase. At frequencies in the range of, for example, 100 kHz, a half-wave metal conical concentrator has a length of about 2-3 cm.

The need of jointly using sections with relatively small, not exceeding 6 mm, and relatively large 12-20 mm diameters in the waveguide structure is caused by contradictory objectives of the present structure. On the one hand, an extensive flexible waveguide section is needed for an easy mount, integration, laying the section "on-site" in an actual structure. To achieve this, in this case, a flexible and a relatively thin metal wire is suggested to be used. On the other hand, a section with relatively large diameters is needed to efficiently match the waveguide and actual electroacoustic transducers (piezoelectric elements, magnetostrictors) and to pass metal partitions, for example, by welding-in a section of a large-diameter waveguide into an actual partition. The larger the diameter of this waveguide section, the larger the thickness of the partition and, respectively, their connecting weld seam can be.

All parts of the acoustic waveguide can be made of the grades of steel resistant to aggressive media. Therefore, the acoustic waveguide can be used under the conditions characterized by high temperatures, high-activity penetrating radiation, strong radioactive interferences, strong vibrations, presence of aggressive substances in the atmosphere. Because the flexible metal rod can be made of the needed length and shaped as needed to be placed in the allocated space, the acoustic waveguide can provide acoustic communication between different devices spaced apart from each other and separated by walls, partitions, divisions, housings.

Figure 5:
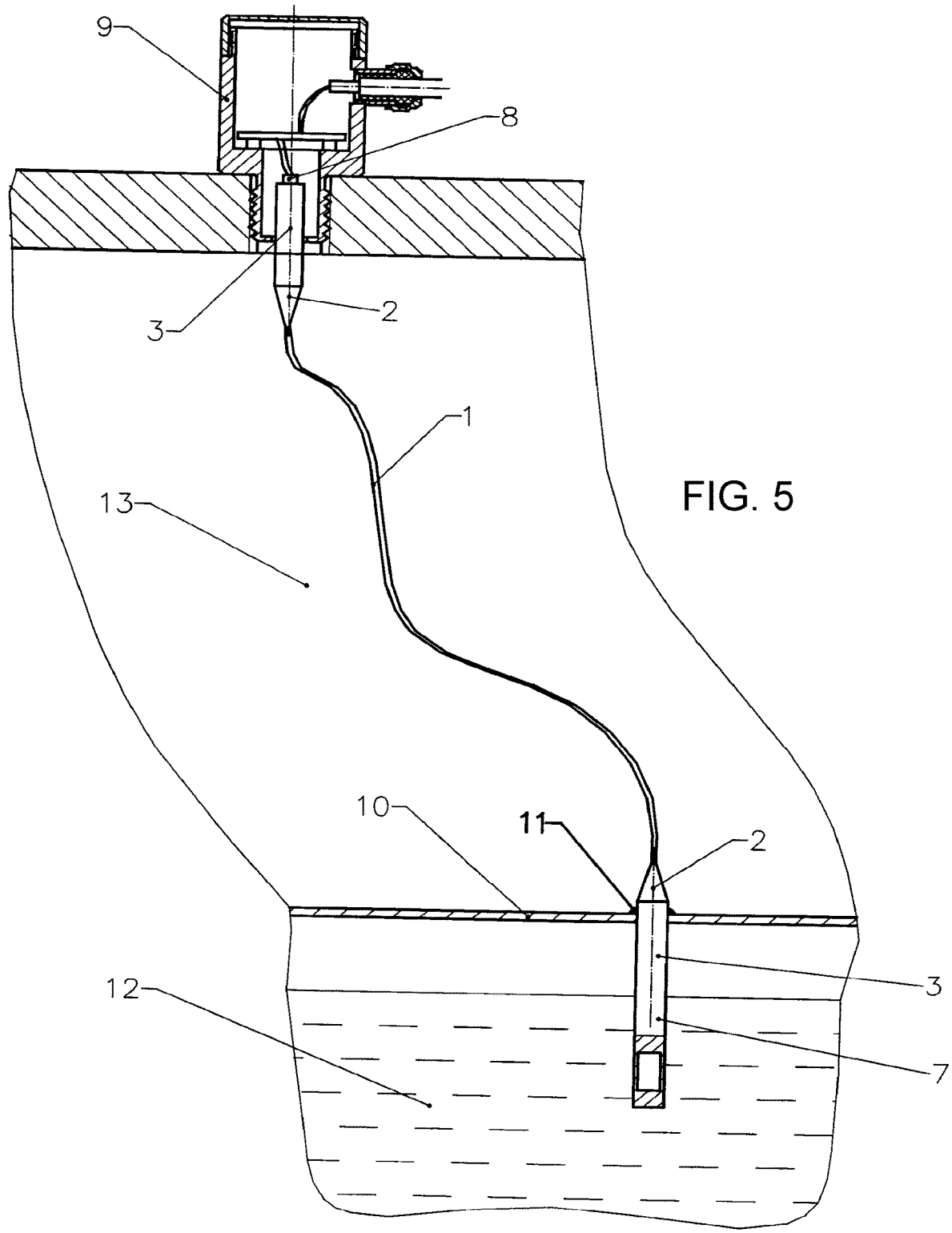
FIG. 5 shows an example of using an acoustic waveguide in an ultrasonic sensor structure.

As an example, FIG. 5 shows a configuration of an acoustic liquid-level sensor utilizing the present acoustic waveguide.

Figure 1:
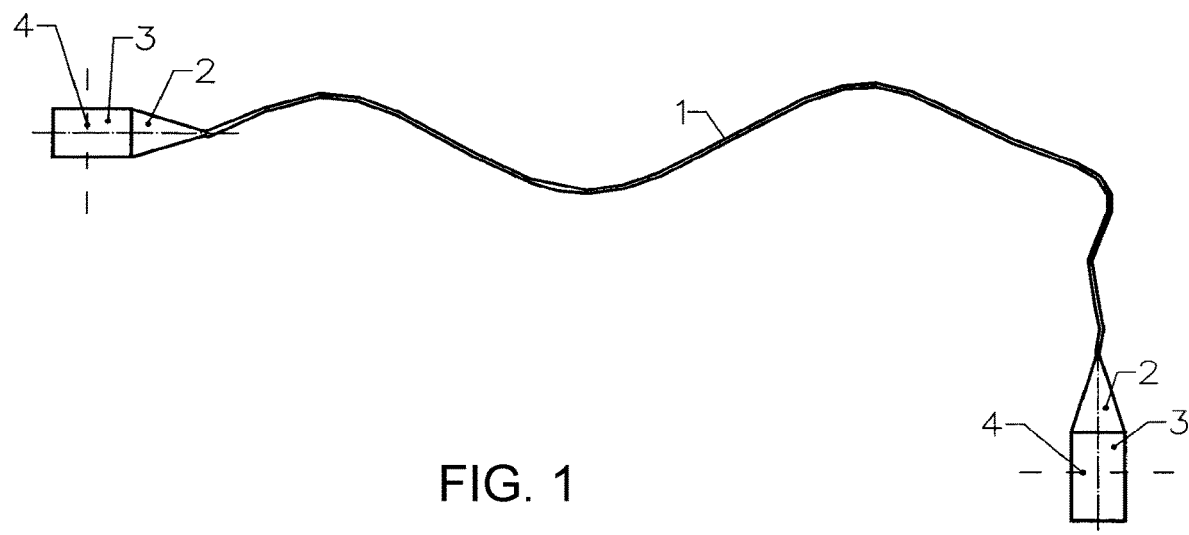
FIG. 1 shows a general view of an acoustic waveguide.

The ultrasonic liquid-level sensor comprises an acoustic resonator 7 placed in a reservoir 12 with a liquid and coupled with electroacoustic transducer 8 by the acoustic waveguide (FIG. 1). The acoustic waveguide comprises flexible metal rod 1 with a corresponding cylindrical waveguide 3 rigidly attached to each end of flexible metal rod 1 via a corresponding conical acoustic concentrator 2. One cylindrical waveguide 3 is coupled to acoustic resonator 7, the other cylindrical waveguide 3 is coupled to electroacoustic transducer 8. Flexible metal rod 1 is a wire. Electroacoustic transducer 2 is placed in a housing 9 allowing it to be installed on any base. FIG. 5 shows attaching of cylindrical waveguide 3 to partition 10 by welding 11.

Such an arrangement of the elements of the acoustic liquid-level sensor makes it possible to isolate electroacoustic transducer 2 from the medium in a volume 13. In turn, inserting an acoustic waveguide into reservoir 12 with the liquid is provided by welding cylindrical waveguide 3 to partition 10. In this case, installation of the sensor is simplified. The sensor elements are disposed in places which are accessible for maintenance and which provide personnel with protection from possible aggressive media and radiation during service maintenance of the electroacoustic transducer and its electrical circuits.

Pulse acoustic oscillations are generated by the pulse generator of the electronic block of electroacoustic transducer 8 (FIG. 5). They are then transmitted to flexible metal rod 1 (wire) via cylindrical waveguide 3 and acoustic concentrator 2. From the opposite side of thin flexible metal rod 1 the oscillations are transmitted to cylindrical waveguide 3 via acoustic concentrator 2, wherein acoustic resonator 7 is attached to the opposite end of the cylindrical waveguide. Having reached the resonator, the acoustic pulse causes natural oscillations in resonator 7, wherein the duration of the natural oscillations depends on the medium (liquid or gaseous) in which the resonator is placed.

After propagating in the direction reverse to the direction of propagation of a driving pulse through the acoustic waveguide, the natural oscillations of resonator 7 reach electroacoustic transducer 8. The electrical circuit of the sensor processes the received oscillations, evaluates the damping factor of the natural oscillations of resonator 7 and makes a determination whether the resonator 7 is disposed in a liquid medium or not.

Other examples of using the acoustic waveguide of the presented configuration, which ensures transmission of ultrasonic oscillations through an aggressive medium over a distance that can be several meters.

In transmission of acoustic signals in receiving and transmitting modes in the antennas of various devices utilizing the location principle, for example, locators measuring a distance in liquids or in a gaseous medium.

In devices measuring the parameters of a medium, for example, temperature, pressure, density, viscosity based on the principle of dependence of frequency, amplitude, oscillation damping of the sensing element on the properties of the medium where the element is placed.

In charging devices of electric accumulators through aggressive media through which no electrical wires can be laid. By using a transducer of mechanical oscillations into electric oscillations attached to the receiving end of the acoustic waveguide and the inverse transducer attached to the other end of the same waveguide.

In communication devices, for example, in digital communication as a sequence of pulses, or in analog communication encoded in the frequency or amplitude of oscillations, through aggressive media using the electroacoustic transducers attached to both ends of the given acoustic waveguide.

What is claimed is:

1. An acoustic waveguide comprising a flexible metal rod,
    wherein each end of the flexible metal rod is rigidly attached to an end of a corresponding cylindrical waveguide through a corresponding conical acoustic concentrator,
    wherein the other end of one cylindrical waveguide is configured for connecting to an electroacoustic transducer and the other end of the other cylindrical waveguide is configured for connecting to an acoustic oscillation receiver;
    wherein an external surface of at least one cylindrical waveguide is configured for being rigidly and hermetically attached to a partition intersected by the at least one cylindrical waveguide;
    wherein a section of the acoustic waveguide comprising the flexible metal rod and the conical acoustic concentrators is disposed in a protective flexible tube; and
    wherein the protective flexible tube is hermetically sealed and comprises adaptors for attaching the section of the acoustic waveguide inside the protective flexible tube, wherein ends of the protective flexible tube comprise adapters for attaching the protective flexible tube to external surfaces of corresponding cylindrical waveguides.

2. The device according to claim 1, wherein the flexible metal rod is shaped to fit in an allocated space.

3. The device according to claim 1, wherein the flexible metal rod is made in a form of a wire.

4. The device according to claim 3, wherein the wire has a diameter not exceeding 6 mm.

5. The device according to claim 1, wherein a top of each conical acoustic concentrator is rigidly attached to the flexible metal rod and a wide part of each conical acoustic concentrator is rigidly attached to the corresponding cylindrical waveguide.

6. The device according to claim 5, wherein a diameter of the top of each conical acoustic concentrator is equal to a diameter of the flexible metal rod, and wherein a diameter of the wide part of each conical acoustic concentrator is equal to a diameter of the corresponding cylindrical waveguide.

7. The device according to claim 1, wherein the other end of the other cylindrical waveguide is configured for being rigidly attached to the receiver.

* * * * *